United States Patent
Gurevitz

[11] Patent Number: 5,759,407
[45] Date of Patent: Jun. 2, 1998

[54] METHOD AND APPARATUS FOR PROCESSING WASTE WATER

[76] Inventor: David Gurevitz, 11/5 HaPisga Str., Ariel, Israel

[21] Appl. No.: 604,741

[22] Filed: Feb. 23, 1996

[51] Int. Cl.⁶ ............................................. B01D 35/06
[52] U.S. Cl. .......................... 210/695; 210/741; 210/744; 210/772
[58] Field of Search ..................... 210/695, 739, 210/741, 744, 772, 222

[56] References Cited

U.S. PATENT DOCUMENTS

| | | | |
|---|---|---|---|
| 3,635,819 | 1/1972 | Kaiser | 210/695 |
| 3,767,571 | 10/1973 | Lorenc et al. | |
| 5,076,914 | 12/1991 | Garaschenko et al. | 210/222 |
| 5,130,027 | 7/1992 | Noble et al. | 210/656 |

*Primary Examiner*—David A. Reifsnyder
*Attorney, Agent, or Firm*—Armstrong, Westerman, Hattori, McLeland & Naughton

[57] ABSTRACT

A method and apparatus for waste water treatment, based on a unique combination of high gradient magnetic separation and magnetically stabilized fluidized bed technology. The method includes adding the auxiliary magnetic material to the waste water and mixing therewith, flowing the mixture through a passage, disposed within the ferromagnetic matrix, and then through the matrix. A magnetic field is generated within the matrix and passage, providing the creation within the passage a magnetically stabilized fluidized bed of auxiliary magnetic material and high gradient magnetic separation within the matrix. The magnetic field is switched off for flushing the ferromagnetic matrix.

11 Claims, 1 Drawing Sheet

5,759,407

1

METHOD AND APPARATUS FOR PROCESSING WASTE WATER

BACKGROUND OF THE INVENTION

The present invention relates to a method for waste water treating, particularly, the method comprising a high gradient magnetic separation and magnetically stabilized bed technology for decreasing contents of pollutants.

One of the known methods for treating of waste water containing oil pollutants is based on adding magnetic material, mixing and flowing the mixture through a ferromagnetic matrix. Particles of the auxiliary magnetic material binding pollutants are trapped in the matrix by high gradient magnetic force and flushed out when the field is switched off, according to the "high gradient magnetic separation method" (see U.S. Pat. No. 3767571). Apparatus for processing waste water with high gradient magnetic separation usually comprises an upright housing with an inlet for mixture of waste water and processed water outlet, a ferromagnetic matrix of fine wires, rods or spheres and magnet means for generating high gradient magnetic field within the ferromagnetic matrix.

The main disadvantage of this method and apparatus relates to the fact that in order to reduce pollutant concentration to a required level, it is necessary to add a considerable quantity of magnetic material and provide a long mixing during the process. A substantial buildup of solids in the ferromagnetic matrix increases the pressure drop to the extent that it becomes impossible to maintain an appropriate flow rate. Thus, frequent flushing out and high energy consumption are necessary.

It is known in the art of the usage of the magnetically stabilized fluidized bed technology for separation certain chemicals from a solution. Such methods comprise flowing a processed solution through a bed of magnetized particles held by radially-uniform magnetic field within a limited volume and further flowing a flushing solution through the bed of magnetized particles (see U.S. Pat. 5130027).

A drawback of such methods lies in inability of satisfactory processing of waste water.

It is therefore one of the major objects of the present invention to overcome the above listed and other drawbacks of the above mentioned methods.

It is a further object of the present invention to provide an improved waste water processing method, based on a unique combination of high gradient magnetic separation and magnetically stabilized fluidized bed technology under certain conditions.

SUMMARY OF THE INVENTION

The present invention provides a method of treating of processing waste water utilizing a high gradient magnetic separation, comprising the steps of adding and mixing magnetic material to waste water, flowing the mixture through a ferromagnetic matrix to subjected the mixture to a magnetic field; switching off the magnetic field, and flushing the ferromagnetic matrix. The improvement comprises the step of preliminary flowing the mixture upward through a passage disposed within the ferromagnetic matrix prior to flowing the mixture through the ferromagnetic matrix, with the flow rate and the strength of the magnetic field selected so as to create a stationary bed of the ferromagnetic material within the passage.

Preferably, the adding of the magnetic material is interrupted when a hydraulic resistance of the stationary bed of the magnetic material or a volume content of the magnetic material in the stationary bed reaches a predetermined value.

Such predetermined value of the hydraulic resistance of dispersion phase of the pollutant and the magnetic material in the stationary bed is an effective processing ranges and is between $1 \times 10^4$ and $2 \times 10^4$ Pa.

The predetermined volume content may be between 50% and 80% by volume.

The magnetic material is preferably a ferromagnetic powder with a particle size substantially between 0.1 and 10 μm.

The magnetic powder may be hydrophobized by mixing in an organic solution of a hydrophobizing agent.

The hydrophobizing agent may be a mixture of fatty acids, with carbohydrate chain containing 10–20 carbon atoms.

The concentration of the said hydrophobizing agent may be 10–30% by volume.

In order to separate heavy metal ions, especially radionuclides, the process may be performed in an aqua media with a pH value maintained at a level more than 6.

In addition, the process may comprise further step of preliminary flushing the magnetic system by an aqua media having pH value substantially between 2 and 4.5.

The present invention also provides an apparatus for processing waste water utilizing a high gradient magnetic separator, and comprising an upright housing having waste water inlet and processed water outlet in its bottom and inlet of flushing solution in its upper portion, ferromagnetic matrix substantially filling up said housing and living free space in its upper magnet means for generating a magnetic field within the housing, a passage disposed within the ferromagnetic matrix and connect at its one end to the treated liquid inlet and at its other end to the space in the upper portion of the housing, means for introducing waste water into the inlet and means for receiving processed water from the outlet, whereby the flow of liquid into the inlet, through the passage, ferromagnetic matrix and out of the outlet creates a stationary bed of magnetic within said passage.

BRIEF DESCRIPTION OF THE DRAWINGS

Further details, features and advantages of the invention will become more clearly understood in the light of the ensuing description of a preferred embodiments thereof, given by way of examples only with reference to FIG. 1, being an arrangement of apparatus for processing waste water utilizing a high gradient magnetic separation in combination with magnetically stabilized fluidized bed technology and proposed according to the principles of the present invention.

DETAILED DESCRIPTION OF THE PREFERRED EMBODIMENTS

Figure 1:
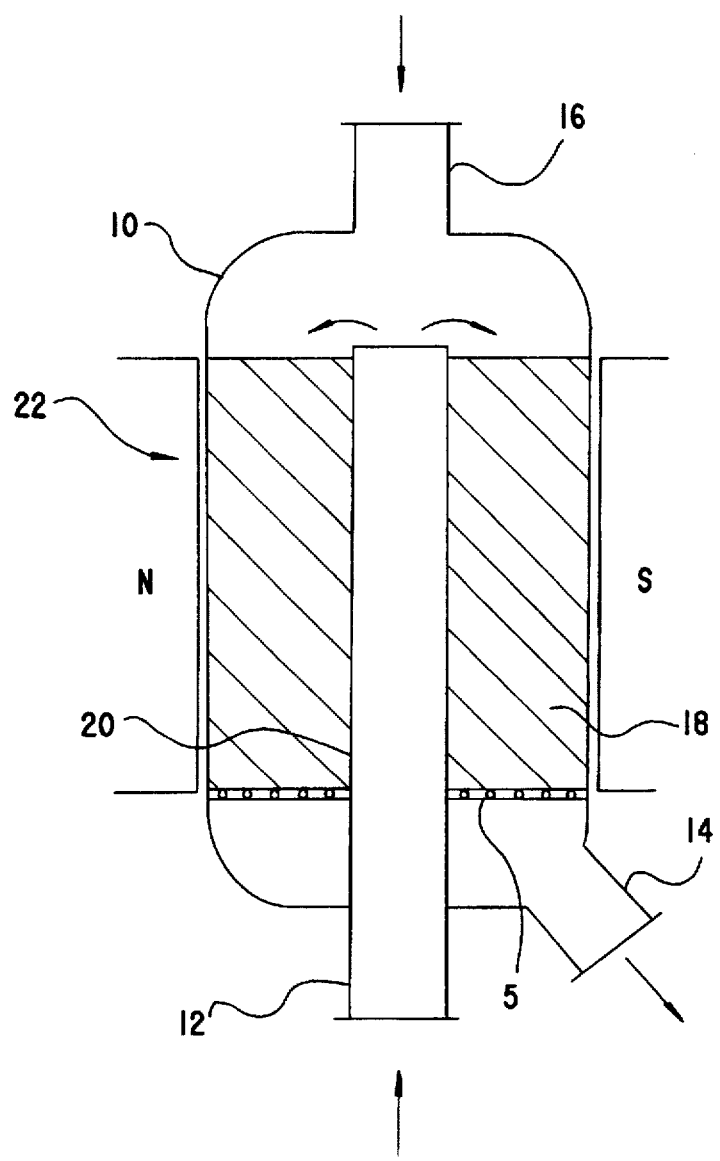

As illustrated in FIG. 1, apparatus for processing waste water comprising an upright housing 10 having a waste water inlet 12 and processed water outlet 14 in its bottom and flushing solution inlet 16 in its top portion. The housing 10 is substantially filled by a ferromagnetic matrix 18 which is spaced from the housing top. The ferromagnetic matrix may be an ordinary one such as fine wires, rods or spheres. Provided outside the housing 10 is a magnet means 22 for generating a magnetic field within the housing 10 and thus within the ferromagnetic matrix 18. Arranged within the ferromagnetic matrix 18 is a passage 20, connected by at one end to the inlet 12 and at its other end to the space in the upper portion of the housing 10. There are provided conventional means for introducing waste water, such as a pump, etc. (not shown) into the inlet 12 and means for receiving processed water from the outlet 14, whereby the flow of water creates a stationary bed of particles of magnetic material in the passage 20.

The apparatus for processing waste water operates in accordance with the principles of the present invention in the following manner.

The magnetic material, preferably ferromagnetic powder, with a particle size substantially between 0.1 and 1 µm, is added to the waste water and mixed with it, for example by a conventional propeller mixer operating for at least 30 min. The magnetic means 22 generates a magnetic field within the housing 10 and main ferromagnetic matrix 18, the magnetic field having a strength approximately 100–500 kA/m. The mixture of treated waste water and auxiliary magnetic material is conveyed through the waste water inlet 12 to the passage 20.

The ferromagnetic particles of the magnetic material are trapped by the magnetic field and create stable structures oriented along the magnetic field lines. Thus, a stationary bed of particles of magnetic material, which has low hydraulic resistance to a liquid flow, is formed within the passage 20. The waste water flow flows through the bed and the particles of magnetic material binds the pollutant, for example, dispersed oils, ions of heavy metals, etc. After passing the bed, the liquid flows out to the space in the upper portion of the housing 10 and then flows through the ferromagnetic matrix 18. The magnetic particles escaped from the bed of magnetic particles are trapped by the ferromagnetic matrix 18, and processed water is conveyed through the outlet 14 to the receiving means for further treatment or usage. The flow through the inlet 12, the passage 20, the ferromagnetic matrix 18 and the outlet 14, and the strength of the magnetic fields, are selected so that the stationary bed of auxiliary magnetic material is created in the passage 20. For example, for flow rate about 100 and 1000 m/hour the strength of the magnetic field ranges between approximately 100–600 A/m.

Because a volume content of the magnetic material in the stationary bed in a range 50% and 80% by volume provides sufficient purification of the waste water, the adding of magnetic material is preferably interrupted when such range is reached. Another criterion for interrupting the adding of magnetic material is the predetermined value of hydraulic resistance of the stationary bed. As was defined, the values $1 \times 10^4 - 2 \times 10^4$ of hydraulic resistance provides an effective processing of the waste water with a low consumption of power and magnetic material.

On reaching the loading capacity of the ferromagnetic matrix, above which solids start to break through, the apparatus is flushed with a flushing solution. For this purpose, the magnetic field is switched off, by electrical switching in a case of electromagnetic system, or by removal of magnets in a case of permanent magnets.

The supply of waste water is stopped and the flushing solution is conveyed into the inlet 16. The magnetic material forming the stationary bed flowing downward through the passage 20, and received from the inlet 12 is regenerated, as follows. A flushing solution, flowing through the ferromagnetic matrix 18, removes the ferromagnetic particles washed up from the bed and trapped by the ferromagnetic matrix 18 and is discharged through the outlet 14.

When it is necessary to increase the efficiency of purification, the ferromagnetic powder is hydrophobized by mixing it with a hydrophobizing agent in organic solution, such as a mixture of fatty acids, preferably containing 10–20 carbon atoms in the carbohydrate chain.

An alternative modification for separating heavy metals ions, especially radionuclides, is possible, in which the process is performed in an aqua media having a pH higher than 6.

Another alternative embodiment of the method is possible in which a preliminary flushing of the ferromagnetic matrix 18 is performed, before switching off the magnetic field, by aqua media having pH between 2 and 4.5. This preliminary flushing is performed by means of supplying the solution into the inlet 12, i.e. like the supply of waste water during the separation.

The invention envisage a modification related to location of the passage 20 within the ferromagnetic matrix 18. In this modification, the passage 20 is displaced from the longitudinal axis of the housing 10 substantially from 0.25 R up to 0.35 R, wherein R is a magnetic gap in the magnetic means. Such a disposition of the passage 20 provides irregular configuration of the magnetic field therewithin to increase the effectiveness of the treatment.

An additional feature of the ferromagnetic matrix is that it is a fibers of iron alloy with amorphous structure, comprising from 10% up to 20% by volume of silicon and from 0.01 up to 1.2% by volume of boron.

EXAMPLE 1.

A magnetite powder with particle size 0.1–1 µm was mixed in solution of stearic and oleic acids in acetone. Summarize concentration of the hydrophobizing agent mixture of stearic and oleic acids was 20% by volume. After drying, the magnetic material was added to the waste water containing oil pollutants and the solution was passed through the apparatus utilizing the high gradient magnetic separation. The flow rate was about 100 m/hour and strength of the magnetic field 400 A/m. Adding of the magnetite powder was interrupted when the hydraulic resistance of the stationary bed within passage disposed within the ferromagnetic matrix reached a value of $2 \times 10^4$ Pa.

EXAMPLE 2.

For processing waste water containing radionuclides the magnetic separation was performed under the aqua media having PH value 7.

EXAMPLE 3.

Example 2 was repeated with preliminary flushing ferromagnetic matrix by aqua media having PH value 3.

The flushing was performed before switching off the magnetic field.

Those skilled in the art will readily appreciated that numerous changes, variations and modifications may be applied to the invention as heretofore exemplified without departing from the scope of the invention as defined and by the appended claims.

What is claimed is:

1. A method for processing waste water utilizing a high gradient magnetic separator, comprising the steps of:

adding magnetic material to waste water containing magnetic material and mixing said added magnetic material with said waste water and forming a mixture of said waste water and said magnetic material contained therein with said added magnetic material;

flowing said mixture through a ferromagnetic matrix and formed therein an exposed magnetic field;

switching off said magnetic-field, and flushing said ferromagnetic matrix;

characterized in that the improvement comprises the step of preliminary flowing said mixture upward through a passage disposed within said ferromagnetic matrix prior to said flowing said mixture through said ferromagnetic matrix, adjusting the preliminary flow rate and selecting a magnetic strength of the magnetic field to create a stationary bed of said ferromagnetic material within said passage.

2. The method as claimed in claim 1 wherein said adding of magnetic material is interrupted when hydraulic resistance of said stationary bed of magnetic material reaches a predetermined value.

3. The process as claimed in claim 2 wherein said predetermined value of the hydraulic resistance is between $1 \times 10^4$ and $2 \times 10^4$ Pa.

4. The process as claimed in claim 1 wherein said adding of the magnetic material is interrupted when the volume content of the magnetic material in the stationary bed reaches a predetermined value.

5. The process as claimed in claim 4, wherein said predetermined value of the volume content is between 50% and 80% by volume.

6. The process as claimed in claim 1 wherein said auxiliary magnetic material is a ferromagnetic powder with a particle size substantially between 0.1 and 10 µm.

7. The process as claimed in claim 6 wherein said ferromagnetic powder is hydrophobized by mixing in an organic solution of hydrophobizing agent.

8. The process as claimed in claim 7 wherein said hydrophobizing agent is a mixture of fatty acids, containing between 10 and 20 carbon atoms in the carbohydrate chain.

9. The process as claimed in claim 8 wherein the concentration of said hydrophobizing agent is substantially between 10% and 30%.

10. The process as claimed in claim 1 wherein said magnetic separation is performed under an aqua media having a pH value higher than about 6.

11. The process as claimed in claim 1 and also comprising a step of preliminary flushing said ferromagnetic matrix by an aqua media having a pH value substantially between 2 and 4.5 before said switching off the magnetic field.

* * * * *